Figure 2:
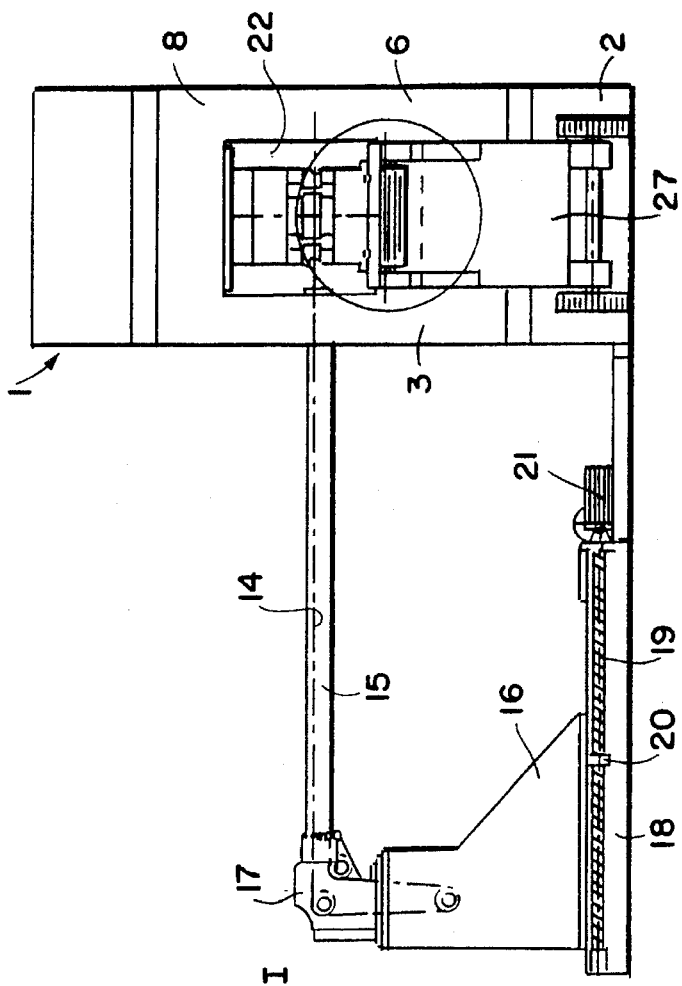

United States Patent
Padovani

[11] Patent Number: 5,619,913
[45] Date of Patent: Apr. 15, 1997

[54] METHOD AND APPARATUS FOR CHANGING DIES IN THERMOFORMING PRESSES

[75] Inventor: Pietro Padovani, Verona, Italy

[73] Assignee: Isap Omv Group SPA, Parona, Italy

[21] Appl. No.: 537,808

[22] PCT Filed: Dec. 27, 1993

[86] PCT No.: PCT/EP93/03699

§ 371 Date: Nov. 1, 1995

§ 102(e) Date: Nov. 1, 1995

[87] PCT Pub. No.: WO94/26509

PCT Pub. Date: Nov. 24, 1994

[30] Foreign Application Priority Data

May 11, 1993 [IT] Italy .................. 93A044

[51] Int. Cl.⁶ .................................................. B30B 15/30
[52] U.S. Cl. ..................... 100/35; 72/446; 100/215; 100/224; 100/229 R; 100/264; 100/918; 425/193; 483/28
[58] Field of Search ............................ 100/35, 215, 224, 100/229 R, 264, 918; 72/446; 425/193, 195; 483/28

[56] References Cited

U.S. PATENT DOCUMENTS

| | | | |
|---|---|---|---|
| 3,207,065 | 9/1965 | Danly | 100/918 |
| 3,455,141 | 7/1969 | Bracco et al. | 100/918 |
| 3,677,675 | 7/1972 | Brown | 425/193 |
| 3,973,472 | 8/1976 | Shirao | 100/425 |
| 4,947,673 | 8/1990 | Baranski | 72/446 |
| 5,113,684 | 5/1992 | Oster | 100/918 |

FOREIGN PATENT DOCUMENTS 1-266993  10/1989  Japan ................. 100/215

*Primary Examiner*—Stephen F. Gerrity
*Attorney, Agent, or Firm*—Ladas & Parry

[57] ABSTRACT

A method and apparatus for replacing the dies (10, 13) in thermoforming equipment provided with a base (2), a supporting structure (12) supported by the base (2), a supporting head (9) for a counter-die (10) carried by the supporting structure, a supporting table (12) for a die supported by the base (2) beneath the supporting head (9), actuation means for the head (9) and for the supporting table (12) to control a sequence of controlled insertion and withdrawal movements between the head (9) and the supporting table (12) to cause the die (13) to close against and open away from the counter-die (10), feed means for a sheet of thermoformable material for pressing designed to operate synchronously with the activating means and including a pair of longitudinal members (15) to advance the sheet in a direction substantially normal to the direction in which the die (13) opens and closes. The method provides for withdrawal of the longitudinal members (15) into a waiting position, insertion or removal of the counter-die (10) closed on the die (13) in a direction transverse to that of the longitudinal members (15) and advance of the longitudinal members (15) from the waiting position to the working position.

22 Claims, 3 Drawing Sheets

METHOD AND APPARATUS FOR CHANGING DIES IN THERMOFORMING PRESSES

DESCRIPTION

This invention relates to a method and apparatus for changing the dies or moulds in thermoforming equipment, typically configured as a vertical thermoforming press, in order to obtain thermoformed objects from a thermoplastics material in sheet form. Equipment for thermoforming and the stacking of hollow objects made from thermoplastics material in sheet form in which provision is made for the use of a male die or mould (generally the upper die) and one (or two) lower female dies has already been proposed.

A sheet of a suitable thermoplastics material is caused to advance stepwise between the upper die and the lower die (or dies) after each closure of the dies.

The sheet is fed along two longitudinal members which support a double chain and which extend towards the die so as to reach and pass beyond the area of the die (or dies).

A feature of this equipment is that as the die (or dies) are guided by sliding along their own guide columns, and the longitudinal members are inserted in the area outside the perimeter of the die, but within the guide columns for the latter, the operation of fitting or removing the die (or dies) is very complex and laborious, particularly as in most cases devices are installed for discharging the objects which are located downstream of the die or dies with respect to the feeding direction of the sheet.

In this situation it is found that the die or dies are as a consequence always imprisoned between the longitudinal members and the devices for discharging the thermoformed objects, and these devices impede access thereto. As a result, in order to fit or remove the die or dies it is always necessary to first remove all the discharge devices to create sufficient working space for the operation, which involves a need for a considerable working area, a considerable expenditure of time, particularly when discharge of the objects is directly connected to a packaging line or another processing line which is synchronised with the production of the objects, and the use of labour or expensive auxiliary equipment for moving the discharge devices.

An object of this invention is to provide a new method for the rapid replacement of dies which does not involve the need to remove the object-discharging devices from the equipment.

Another object of this invention is to provide a method for replacing the dies which will avoid the need to introduce these in the direction of advance of the chains and therefore longitudinally to the longitudinal members.

Another object of this invention is to provide thermoforming equipment based on a new concept which will allow the dies to be fitted and removed after the longitudinal members for transporting the sheet have been removed in a simple and automatic manner from the area of the die or dies.

According to a first aspect of this invention a method is provided for replacing the dies in thermoforming equipment which comprises a base, a supporting member supported by the base, a supporting head for one or more counter-dies borne by the supporting structure, a supporting table for one or more dies supported by the base beneath the supporting head, actuation means for the head and for the supporting table to control a sequence of controlled insertion and withdrawal movements between the head and the supporting table to cause the or each die to close against or open away from the corresponding counter-die or dies, feed means for a sheet of thermoformable material for the or each die designed to operate synchronously with the said actuation means and including a pair of longitudinal members to advance the or each sheet in a direction substantially normal to the direction in which its respective die opens and closes, characterised in that it comprises withdrawal of the longitudinal members into a waiting position, the lateral insertion or removal of the or each counter-die closed against the or its respective die and advance of the longitudinal members from the waiting position to the working position.

According to another aspect of this invention there is provided thermoforming apparatus or equipment having a base, a supporting structure supported by the base, a supporting head for one or more counter-dies borne by the supporting structure, a supporting table for one or more dies supported by the base beneath the supporting head, actuation means for the head and for the supporting table to control a sequence of controlled insertion-withdrawal movements between the head and the supporting table to cause the or each die to close against and open away from the or its respective counter-die, feed means for a sheet of thermoformable material for the or each die designed to operate synchronously with the said activating means and including a pair of longitudinal members to advance the or the corresponding sheet in a direction substantially normal to the opening/closing direction of the or the corresponding die, and characterised in that it comprises at least one lateral opening in the supporting structure to allow loading or removal of the or each counter-die closed against the or the corresponding die in a direction transverse to that of the longitudinal members and therefore to that of the or its respective sheet of thermoformable material.

Advantageously guide means for the or each die and the or its respective counter-die are provided in the loading or removal opening in order to assist their removal and accurate positioning.

Figure 1:
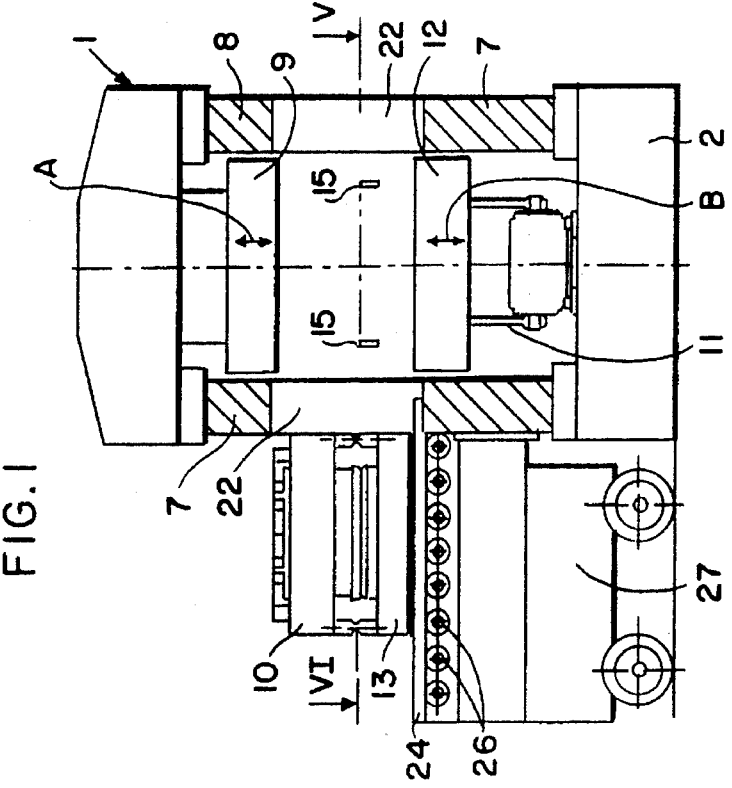
Figure 4:
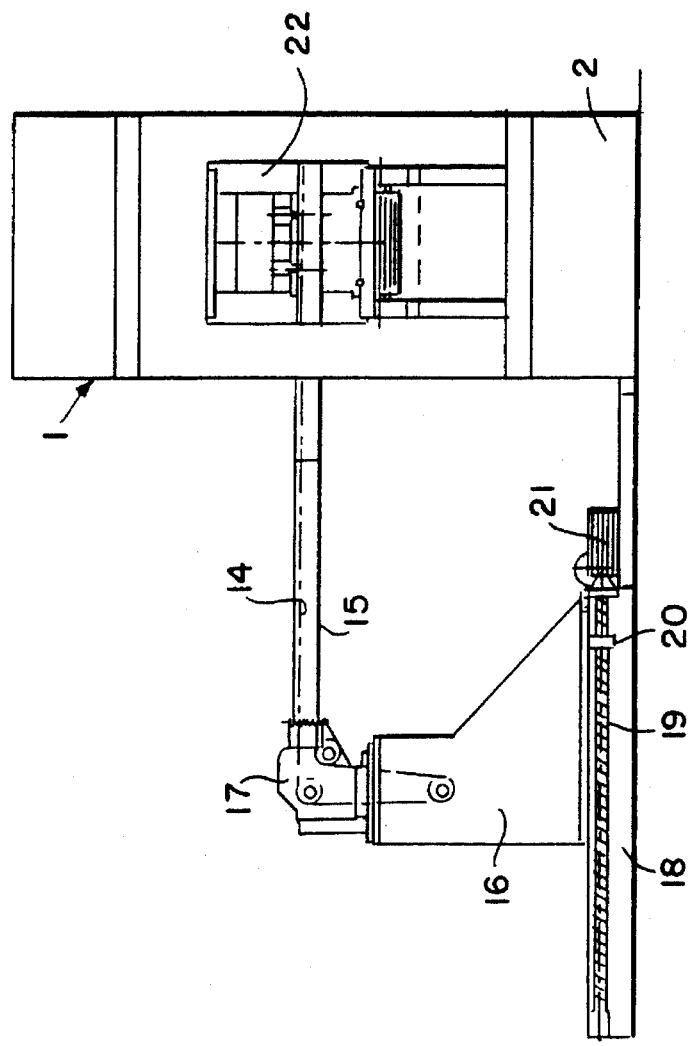
Figure 3:
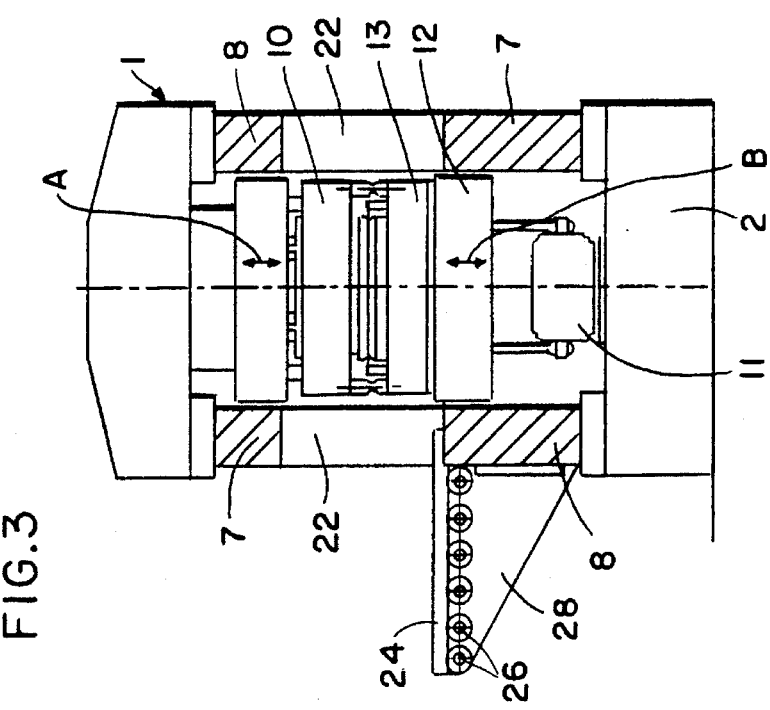
Figure 5:
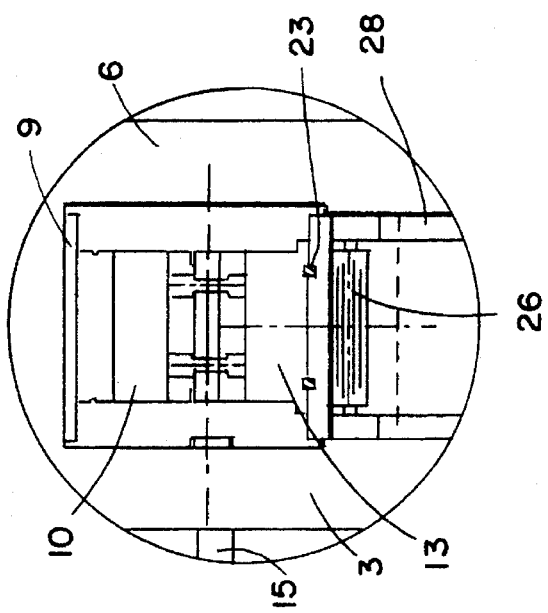
Figure 6:
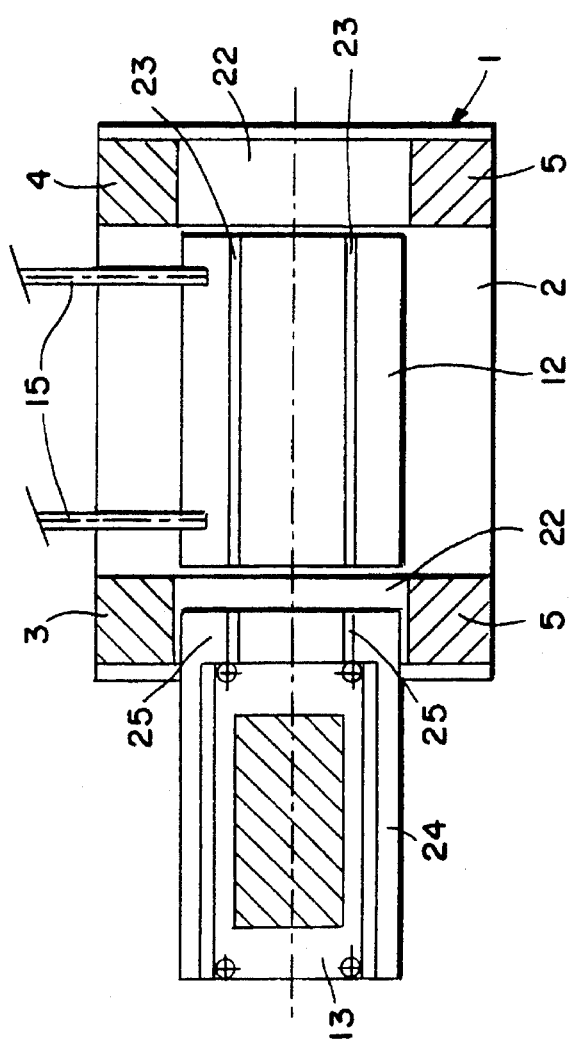

Further features and advantages of this invention will be more apparent from the following detailed description of preferred but not exclusive embodiments given by way of non-restrictive examples with reference to the accompanying drawings, in which:

FIG. 1 illustrates diagrammatically in front elevation and with parts in cross-section a first embodiment of thermoforming equipment according to this invention with a closed die on the point of being introduced into the equipment, FIG. 2 is a lateral side with parts in cross-section of the thermoforming equipment in FIG. 1, FIG. 3 is a view similar to that in FIG. 1, but relating to a variant in which the closed die has already been introduced into the equipment, FIG. 4 shows a side view with parts in cross-section of the thermoforming equipment in FIG. 3, FIG. 5 shows a detail of FIG. 2 on a magnified scale, and FIG. 6 illustrates a view in cross-section along the line VI—VI in FIG. 1.

In the attached drawings identical or similar parts or components are identified by means of the same reference numbers. With reference to the Figures listed above, it will be noted that a thermoforming unit 1 according to this invention comprises a base 2, for example a rectangular foot, upon which rises a supporting structure, typically comprising four uprights 3, 4, 5 and 6, and lower 7 and upper 8 crossmembers. The uprights bear at the top a head 9 supporting a counter-die 10 which can be moved in the vertical direction, as indicated by the double arrow A in FIGS. 1 and 3. At a specific distance beneath head 9 base 2 supports a supporting table 12 by means of a raising and lowering mechanism 11. Table 12 also moves in a vertical direction as indicated by the double arrow B in FIGS. 1 and 3, and is intended to support a female die 13 which may also consist of two female dies placed side by side and in the same plane. The vertical movements of both head 9 and table 12 are controlled by the mechanism 11 of any suitable type capable of controlling a sequence of controlled insertion and withdrawal movements between the head and the supporting table in order to cause die 13 to close against and open away from counter-die 10.

Between die 13 and counter-die 10 there is fed a sheet (not shown) of thermoformable material through the agency of feed means comprising a chain conveyor 14 mounted in two parallel longitudinal members 15 and designed to advance the sheet in steps synchronously with the actuation means for head 9 and table 12. As may be seen in FIG. 6, longitudinal members 15 extend in a direction perpendicular to the front of unit 1 and join at one of their ends above table 12, while at their other end they are supported by a slide or trolley 16 (FIGS. 2 and 4) upon which are supported a stepping geared motor 17 for advancing chains 14 and which is slidably supported on a fixed bed 18. Trolley or slide 16 may be displaced along bed 18 parallel to longitudinal members 15, for example by means of a screw 19 and nut 20 actuation device operated by a geared motor 21.

Between uprights 3 and 6 or 4 and 5 and respective upper and lower cross-members 7 and 8 of the supporting structure there is a lateral opening or window 22 to allow counter-die 10 closed against die 13 to be loaded or removed in a transverse direction, e.g. a substantially normal direction with respect to that of longitudinal members 15 and therefore that of the sheet of thermoformable material. To this end two fixed guides, for example in the form of rails or slide grooves 23 extending in a perpendicular direction with respect to longitudinal members 15, are provided on table 12, whereas a loading plane surface 24 which is also provided with fixed parallel sliding guides having the same separation as guides 23 on table 12 can advantageously be provided alongside opening 22 for passage of the die and counter-die.

The threshold to window 22 is provided at such a level that loading surface 24 supported thereon is coplanar with table 12. Surface 24 may be supported in various ways. Thus, it may be supported by a set of rollers 26 provided on a trolley 27 which can be made to approach and withdraw from unit 1, in which case the assembly consisting of die 13 and counter-die 10 can be moved by the said trolley 27 when it is outside the equipment (FIGS. 1 and 2), or by means of a bracket 28 supported by the supporting structure of unit 1 (FIGS. 3 and 4), in which case the die and counter-die assembly can be moved by means of a gantry crane.

With the structure described above, when it is necessary to replace a die and counter-die assembly the first operation is to remove longitudinal members 15, by operating geared motor 21, which moves slide 16 and, therefore, the longitudinal members, from the working position illustrated in FIG. 4 to the withdrawn waiting position illustrated in FIG. 2.

The die is then closed against the counter-die, counter-die 10 is detached from head 9 and die 13 from table 12, and then the die and counter-die assembly is moved along guides 23 onto plane surface 24 to be removed either by means of trolley 27 or by lifting upward.

For loading the procedure takes place in reverse. When a die and counter-die assembly is provided in a position in which one is closed against the other it is only necessary to push it, e.g. by hand, first along guides 25 and then along guides 23 of table 12, after which the female die is attached to table 12 and the counter-die to head 9. Once attachment is complete the die and the counter-die are perfectly "centred", that is perfectly vertically aligned, because they are fitted while being in the closed position.

Longitudinal members 15 are then advanced into the working position and the equipment is ready to resume a new working cycle in a very short time and with the involvement of personnel without a high level of skill.

The invention described above is susceptible of numerous modifications and variations within the scope defined by the following claims.

Thus, for example, suitable means for pulling or pushing (which can easily be conceived by one skilled in the art) may be provided for the die and counter-die assembly for automatic loading or unloading of the die and counter-die assembly through lateral window 22.

Such means may be provided with suitable controls to ensure that the assembly only moves after perfect alignment has been achieved between guides 23 on table 12 and guides 25 on loading surface 24.

I claim:

1. A method for fitting or replacing dies in thermoforming equipment provided with a base, a supporting structure supported by the base, a supporting head for at least one counter-die supported by the supporting structure, a supporting table for at least one die supported by the base beneath the supporting head, actuation means for the head and for the supporting table to control a sequence of controlled insertion and withdrawal movements between the head and the supporting table to cause said at least one die to move relative to the corresponding counter-die, feed means for a sheet of thermoformable material for said at least one die designed to operate synchronously with said actuation means and including a pair of longitudinal members to advance the sheet in a transverse direction with respect to the direction of relative movement of the said at least one comprising withdrawing the longitudinal members into a waiting position, laterally displacing said at least one counter-die closed against the said at least one die in a direction transverse to that of the longitudinal members advancing the longitudinal members from the waiting position to a working position.

2. A thermoforming apparatus having a base, a supporting structure supported by the base, a supporting head for at least one counter-die supported by the supporting structure, a supporting table for at least one die supported by the base beneath the supporting head, actuation means for the head and for the supporting table for controlling a sequence of controlled insertion and withdrawal movements between the head and the supporting table to cause said at least one die to move relatively to said at least one counter-die, feed means for a sheet of thermaformable material for said at least one die which operates synchronously with the actuation means and including a pair of longitudinal members for advancing the sheet in a direction substantially normal to the direction of opening and closing of the dies, the supporting structure having at least one lateral opening therein to allow an assembly comprising said at least one counter-die closed against the said at least one die to be displaced in a transverse direction with respect to that of the longitudinal members.

3. An apparatus according to claim 2, in which guide means for the said die and counter-die assembly are provided alongside the loading or removal opening in order to assist movement of the assembly and its accurate positioning on the supporting table.

4. An apparatus according to claim 3, in which the said guide means include a pair of parallel projections provided on the said supporting table.

5. An apparatus according to claim 4, in which the said guide means comprise a supporting and guide surface which can be brought alongside the said supporting table through the said lateral loading opening.

6. An apparatus according to claim 4, in which the said longitudinal members are supported by a slide or trolley equipped with means for moving the longitudinal members between an advanced working position in which one end of the longitudinal members lies above the said supporting table and a withdrawn waiting position in which the longitudinal members are moved away from the supporting table.

7. An apparatus according to claim 3, in which the said guide means comprise a supporting and guide surface which can be brought alongside the said supporting table through the said lateral loading opening.

8. An apparatus according to claim 7, comprising supporting means for the said supporting surface.

9. An apparatus according to claim 8, in which the said supporting means comprise a roller.

10. An apparatus according to claim 9, in which the said supporting means comprise a trolley which can be advanced towards and removed away from the loading opening.

11. An apparatus according to claim 10, in which the said longitudinal members are supported by a slide equipped with means for moving the longitudinal members between an advanced working position in which one end of the longitudinal members lies above the said supporting table and a withdrawn waiting position in which the longitudinal members are moved away from the supporting table.

12. An apparatus according to claim 9, in which the said supporting means comprise a bracket borne by the supporting structure.

13. An apparatus according to claim 9, in which the said longitudinal members are supported by a slide equipped with means for moving the longitudinal members between an advanced working position in which one end of the longitudinal members lies above the said supporting table and a withdrawn waiting position in which the longitudinal members are moved away from the supporting table.

14. An apparatus according to claim 8, in which the said supporting means comprise a bracket borne by the supporting structure.

15. An apparatus according to claim 14, in which the said longitudinal members are supported by a slide or trolley equipped with means for moving the longitudinal members between an advanced working position in which one end of the longitudinal members lies above the said supporting table and a withdrawn waiting position in which the longitudinal members are moved away from the supporting table.

16. An apparatus according to claim 8, in which the said longitudinal members are supported by a slide equipped with means for moving the longitudinal members between an advanced working position in which one end of the longitudinal members lies above the said supporting table and a withdrawn waiting position in which the longitudinal members are moved away from the supporting table.

17. An apparatus according to claim 7, in which the said longitudinal members are supported by a slide equipped with means for moving the longitudinal members between an advanced working position in which one end of the longitudinal members lies above the said supporting table and a withdrawn waiting position in which the longitudinal members are moved away from the supporting table.

18. An apparatus according to claim 3, in which the said longitudinal members are supported by a slide or trolley equipped with means for moving the longitudinal members between an advanced working position in which one end of the longitudinal members lies above the said supporting table and a withdrawn waiting position in which the longitudinal members are moved away from the supporting table.

19. An apparatus according to claim 3, in which the said guide means include a pair of recesses provided in the said supporting table.

20. An apparatus according to claim 2, in which the said longitudinal members are supported by a slide equipped with means for moving the longitudinal members between an advanced working position in which one end of the longitudinal members lies above the said supporting table and a withdrawn waiting position in which the longitudinal members are moved away from the supporting table.

21. An apparatus according to claim 20, in which the said displacement means include a geared motor and a screw and nut activating device.

22. An apparatus according to claim 2, in which the said longitudinal members are supported by a trolley equipped with means for moving the longitudinal members between an advanced working position in which one end of the longitudinal members lies above the said supporting table and a withdrawn waiting position in which the longitudinal members are moved away from the supporting table.

* * * * *